United States Patent [19]

Kato et al.

[11] Patent Number: 5,438,943
[45] Date of Patent: Aug. 8, 1995

[54] GUARD DEVICE FOR SEWING MACHINES

[75] Inventors: Shigemasa Kato, Kamakura; Shigeki Okawa, Hachioji; Masafumi Susaki, Chofu, all of Japan

[73] Assignee: Juki Corporotion, Chofu, Japan

[21] Appl. No.: 136,455

[22] Filed: Oct. 13, 1993

[30] Foreign Application Priority Data

Oct. 13, 1992 [JP] Japan ............... 4-071238 U

[51] Int. Cl.⁶ .................. D05B 83/00; F16H 57/02
[52] U.S. Cl. ..................... 112/261; 112/258; 474/144; 74/609; 74/612
[58] Field of Search ............. 112/261, 258; 74/608, 74/609, 612; 474/144, 145, 146, 101, 136, 140

[56] References Cited

U.S. PATENT DOCUMENTS 461,497 10/1891 Dobeck ............... 474/144 X
3,834,335 9/1974 La Police et al. ........... 112/261
4,917,656 4/1990 Sato et al. .

FOREIGN PATENT DOCUMENTS 55-1570 1/1980 Japan .
55-25039 6/1980 Japan .

*Primary Examiner*—Clifford D. Crowder
*Assistant Examiner*—Paul C. Lewis
*Attorney, Agent, or Firm*—Morgan & Finnegan

[57] ABSTRACT

A guard device for sewing machine disposed on a table composed of a first or fixed covering for covering over a lower portion of a belt, and a second or movable covering adapted to shield the belt other than that covered by the first covering. The first covering is provided with an open space or opening defined by its side walls and a lid hingedly mounted on a finger or engageable portion of a wall member of the first covering as to be self-opening or self-closing when a head of the sewing machine is in a collapsed position or in an upright position.

9 Claims, 5 Drawing Sheets

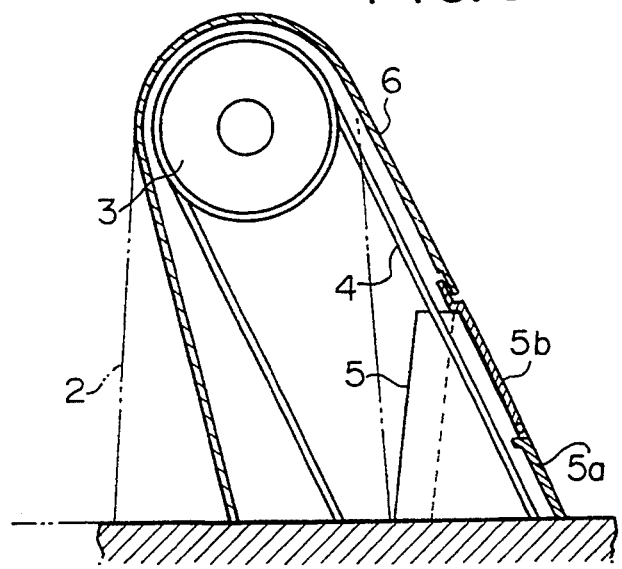
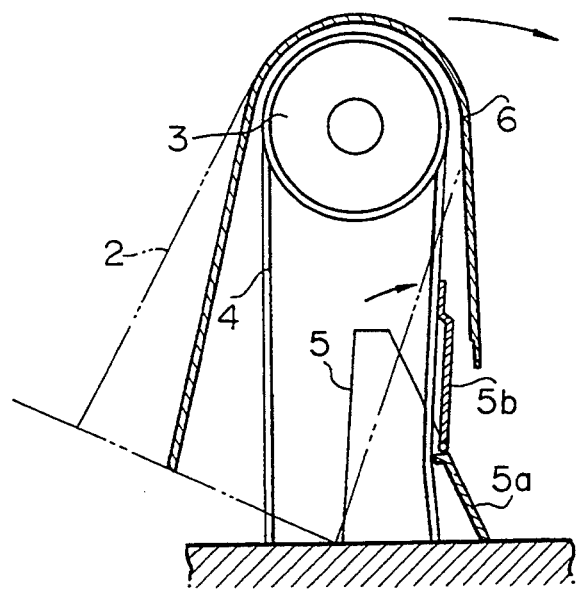

GUARD DEVICE FOR SEWING MACHINES

BACKGROUND OF THE INVENTION

This invention relates to a guard device for sewing machines, and more particularly to a guard structure which allows access to the belt when repairs or the like are required.

Various types of sewing machine guard devices have been heretofore proposed. For instance, in the guard device disclosed in Japanese Utility Model Publication Sho 56-47404, a first covering or casing, and a second covering or casing of cross-section contoured to encompass the first casing are provided. The second casing is configured to so extend its rear wall across over the first casing as to accommodate various types of sewing machines of different height relative to the surface of a table. The first casing is provided on its rear wall upwardly thereof with an opening for engaging the belt when the sewing machine head is leant back or tipped back, thereby bending the belt to prevent the latter from slaking excessively.

In such a guard device, the opening is never closed or shielded, that is, various small articles, foreign matters, and dusts or the like may enter thereinto to prevent the belt from being driven or fingers may run through the opening.

A primary object of the present invention is, therefore, to provide a guard device for a sewing machine, which is so arranged so as to prevent the belt from being slackened during the sewing machine-off time.

It is a further object of the invention to provide a guard device for a sewing machine which provides not only dust protection but also safety against injury to the operator to perform safe and efficient sewing operation.

It is another object of the present invention to provide a guard device which assures fast start and stop of the sewing machine after and before repairs thereof.

It is still another object of the invention to provide a guard device for a sewing machine which includes an open space or channel defined by side walls or a first casing to have a lid self-opening and self-closing when the sewing machine head is turned over and raised to return to its original position.

These and other objects of the invention are attained by providing a guard device for a sewing machine, which comprises a first casing for shielding a head of the sewing machine rearwardly and downwardly thereof, and a second casing adapted to cover up the belt exposed on the table except for the belt shielded by the first casing, the second casing being mounted to the machine head and swingable with the machine head. The first casing of U cross section includes a pair of side walls and a rear wall or a wall member to encompass the belt. The first casing is formed with a lid with which the channel is closed or uncovered, and a finger or tongue formed above the wall member to engage the belt or the second casing to open or close the channel or open space when the machine head is turned over or raised.

One aspect of the present invention is that the belt is leant as the sewing machine head is tipped over, and eventually abuts against the lid over the channel. The belt is further leant to swing the lid to keep the latter away from the channel or the open space. This will allow the belt to enter into the channel, thus engaging the finger of the wall member to bend the belt to prevent excess slack in the belt.

Another aspect of the present invention is that the free end of the lid which has been turned over is engaged with one end of the second covering swingable with the machine head, thereby returning to a position where the channel is shielded.

DESCRIPTION OF THE DRAWINGS

A preferred embodiment of the invention will be illustrated in conjunction with the accompanying drawings in which:

FIG. 3 is an end elevational view of the guard device schematically showing the manner in which the guard device is actuated;

FIG. 4 is an end elevational view of the guard device schematically showing the manner in which the guard device is actuated;

DESCRIPTION OF THE INVENTION

Figure 1:
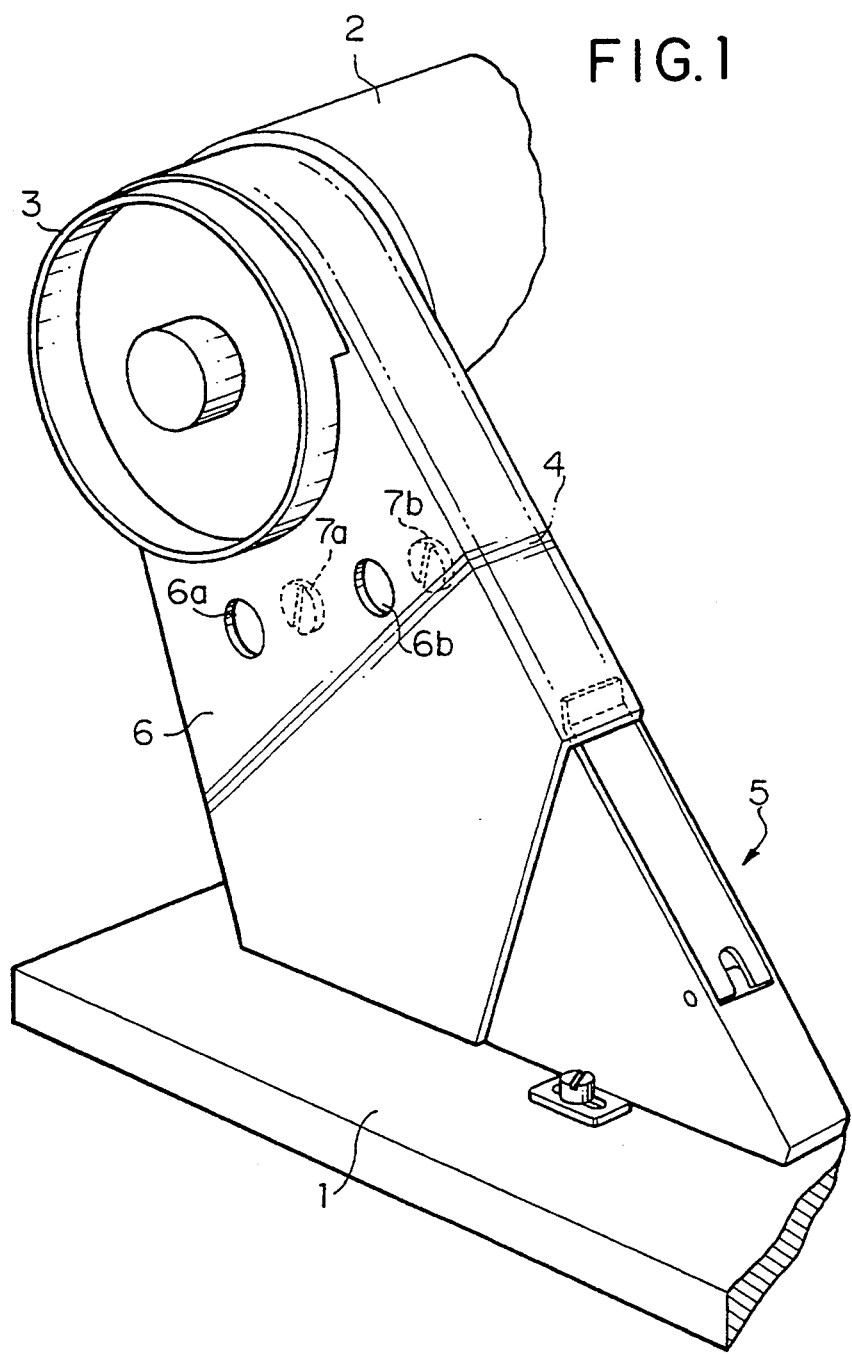
FIG. 1 is a perspective view of the sewing machine with a portion partially broken away, to which a guard device according to the present invention is mounted.
Figure 6:
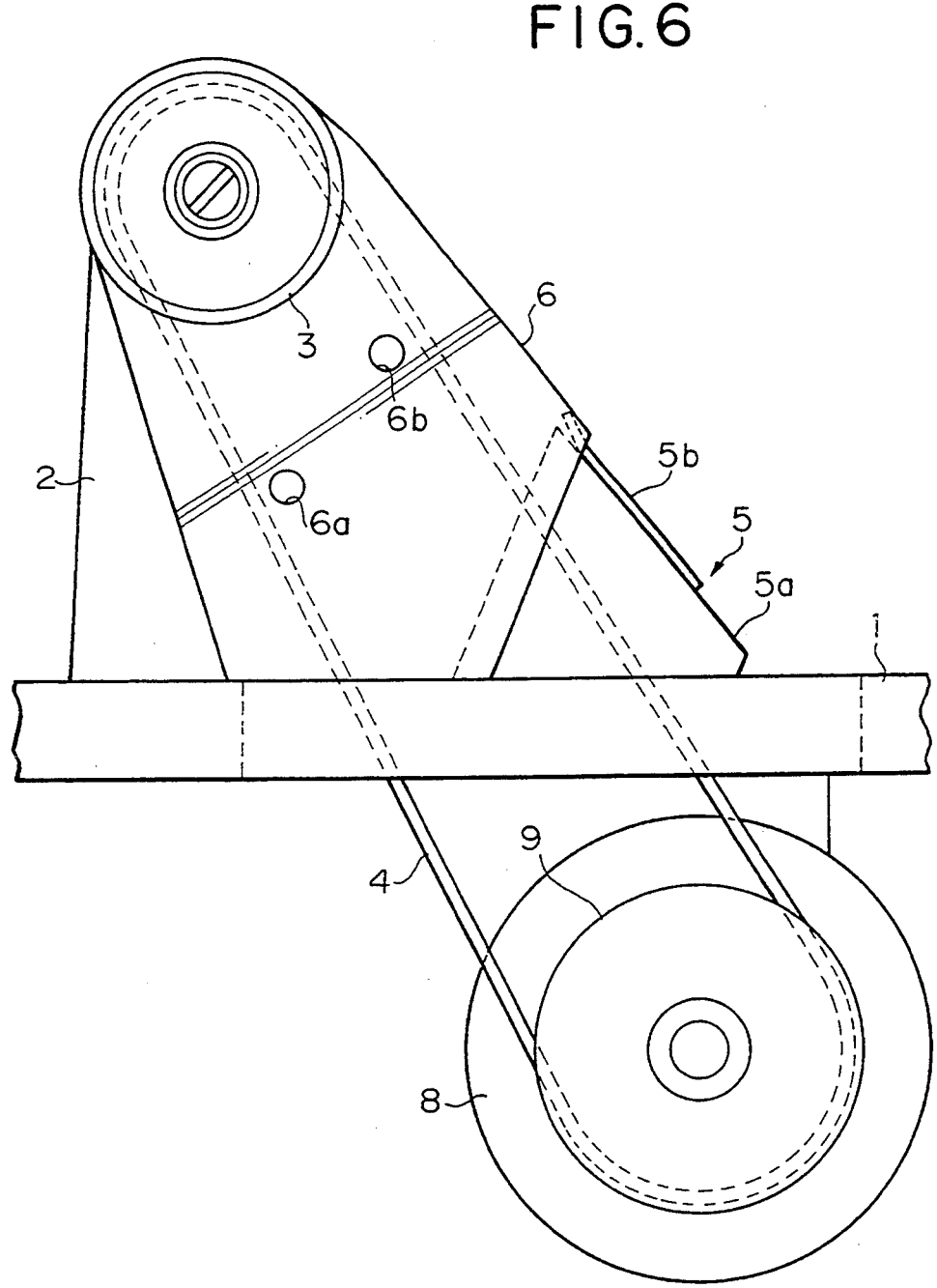
FIG. 6 is an end elevational view of a sewing machine to which the present invention is applied.

Referring now to FIGS. 1 and 6, there is illustrated a table 1 and a head 2 of the sewing machine mounted hingedly on the table so as to be rearwardly leant or tipped back. A belt 4 is provided to connect a pulley 3 for the machine head 2 and a pulley 9 for a clutch motor 8 as a drive source, which is positioned downwardly of the table.

Numeral 5 is a first or fixed covering in a triangular form which is adapted to shroud a lower portion of the machine head 2 at the rear side thereof, thus extending over a portion of the belt exposed on the table 1. The first covering 5 is secured to the table 1 by screws through holes in flanges formed at the lower end of the side walls of the fixed covering.

A second or movable covering 6 serves to shroud the belt 4 exposed other than that covered with the first covering 5 a forehead side wall of which is bored to form holes 6a, 6b for permitting screws 7a, 7b coaxially therewith to pass therethrough for fixation to the second covering 6. The second covering 6 is of such cross section as to encompass the first covering 5. The first covering 5 is inserted relative to the second covering 6 when the second covering 6 is swung with the machine head 2, as will be described later.

Figure 2:
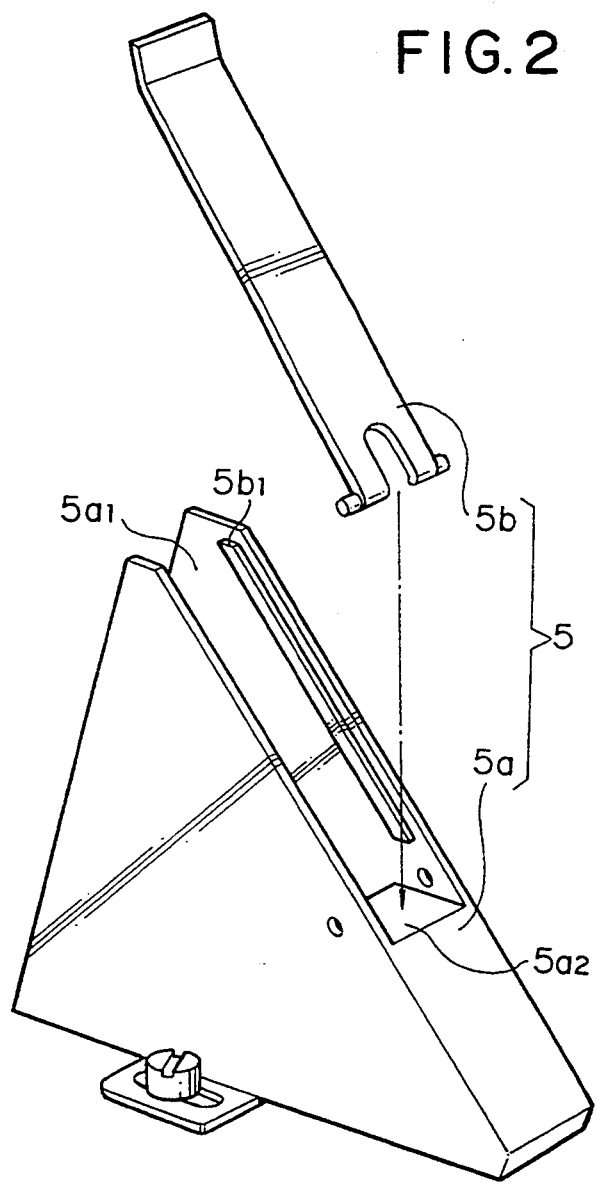
FIG. 2 is a perspective view of the guard device showing how the guard device is configured.

As shown in FIG. 2, the first covering 5 of U cross section consists of a pair of side walls, a wall member 5a and a lid 5b for enclosing the belt 4 in the fixed covering. The wall member 5a is provided upwardly thereof with an open space 5a1 which is defined by the opposite side walls to engage the belt when the machine head is leant or tipped back. The lid 5b is rotatably journaled to the open space 5a1 and carries hinges to be engaged with the back side of the second covering 6. The lid 5b is normally positioned to close the open space 5a1. A support bar 5b1 in the form of a ridge or hem is formed peripherally of the open space 5a1 to support the lid 5b in a closed condition.

The sewing machine head 2 is shown in FIG. 3 as in an upright position where the lid 5b abuts against the support bar 5b1 to shield the open space 5a1. As best shown in FIG. 4, the belt 4 tends to abut against the lid to lean it in the direction of an arrow as the machine head 2 initiates its backward leaning. Hinge movement of the lid 5b uncovers the open space 5a1 to allow the belt to enter thereinto, thus establishing abutment of the latter with a finger 5a2 of the open space 5a1.

Figure 5:
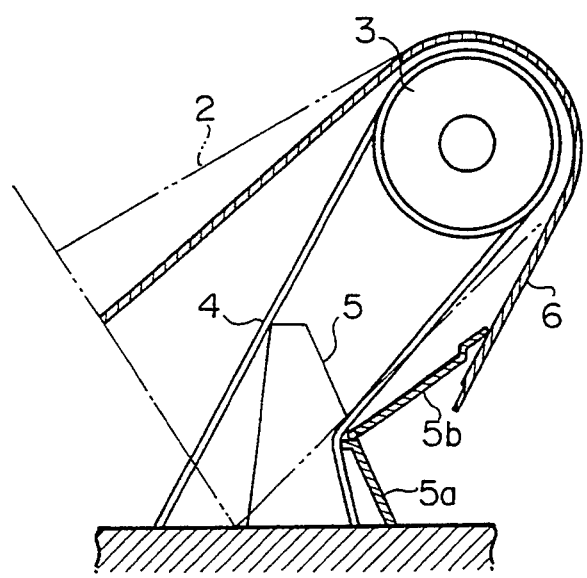
FIG. 5 is an end elevational view of the guard device schematically showing the manner in which the guard device is actuated.

The sewing machine head 2 is illustrated in FIG. 5 as leant or tipped back. In such a position, the belt 4 is engaged with the finger 5a2 of the trough and is then bent so that the belt is prevented from slackening excessively and from slipping out of the pulleys or the like. In this manner, the open space or channel 5a1 is fully uncovered to have the belt entered thereinto.

For restoration of the machine head 2 to the original upright position, the head is turned in the opposite direction as shown in FIG. 5 and in this position the free end of the lid 5b is urged by the lower end of the second covering and then counterclockwise rotated, thus returning to the position where the support bar 5b1 is located. Consequently, the open space is fully shielded by the lid 5b.

In this manner, the open space 5a1 may be self-closing and self-opening by swingable movement of the machine head 2 and of the lid 5b.

The scope of the present invention should be determined not by the scope of the aforementioned detailed description of the preferred embodiments, but by the appended claims and their legal equivalents.

We claim:

1. In a sewing machine including a head of said sewing machine disposed on a table of said sewing machine wherein said head being mounted to swing downwardly in a direction opposite to an operator and from a position in which said head is raised to a position in which said head is collapsed, a motor located downwardly of said table, a pulley fixed to a main shaft of said sewing machine head, and a belt extended between said pulley and a pulley of said motor for transmission of its rotation, a guard device on said table for covering over said belt, said guard device for said sewing machine including a fixed cover for covering over a lower portion of said belt located upwardly of a surface of said table, and a movable cover adapted to cover over at least a portion of said belt not covered by said fixed cover when said sewing machine head is in its raised position and movable following rotation of said sewing machine head between said positions, said fixed cover comprising a channel upwardly opened to have said belt entered thereinto when said sewing machine head is in its collapsed position; an end face disposed on a side opposite to said opening as to engage with said belt entered into said channel when said sewing machine head is in its collapsed position; and an auxiliary cover for covering over said channel when said sewing machine head is in its raised position and opening said channel when said sewing machine head is in its collapsed position, wherein said auxiliary cover is supported on said fixed cover to rotate about a lower end of said auxiliary cover and to engage an upper end of said auxiliary cover with an inside surface of said movable cover.

2. The guard device for a sewing machine as described in claim 1 wherein said auxiliary cover is positioned to form a center of rotation thereof as to maintain engagement of the upper end of said auxiliary cover with the inside of said movable cover during the period of the time when the sewing machine head is rotated from its raised position to its collapsed position.

3. The guard device for a sewing machine as described in claim 1 wherein said fixed cover includes a holding member for holding said auxiliary cover in its covering position when said sewing machine head is in its raised position.

4. A guard device for a belt in a sewing machine having a swingably mounted head, comprising:
   first casing means for shielding at least a portion of said belt, said first casing means comprising a pair of side walls and lid means for pivoting with respect to said side walls; and
   second casing means for shielding at least a portion of said belt, wherein upon rotation of mid sewing machine head from an original upright position to a tipped back position said lid means engages said belt throughout at least a portion of said rotation to shield at least a portion of said belt, wherein at least one of said side walls comprises at least one support bar to prevent contact between said lid means and said belt when said sewing machine is in said original upright position.

5. The guard device of claim 4 wherein at least a portion of said second casing means performs the additional function of engaging said lid means so as to cause said lid means to abut said at least one support bar when said sewing machine is in said original upright position.

6. The guard device of claim 5 wherein said second casing means performs the additional function of engaging said lid means throughout at least a portion of the rotation of the sewing machine head from said tipped back position to said original upright position, thereby rotating said lid means toward said at least one support bar.

7. The guard device of claim 4 wherein at least a portion of said lid means performs the additional function of abutting said second casing means when said sewing machine is in said tipped back position.

8. A method for shielding a belt on a sewing machine comprising:
   shielding at least a portion of said belt within a first casing means having a portion fixed on a sewing machine table;
   shielding at least a portion of said belt within a second casing means mounted on a head of said sewing machine; and
   rotating said sewing machine head from an original upright position to a tipped back position thereby rotating said second casing means causing a lid means on said first casing means to rotate with respect to said first casing means and further causing said belt to abut said lid means thereby rotating said lid means, at least a portion of said belt continuing to be shielded by said first and second casing means during Said rotation of the sewing machine head.

9. The method of claim 8 wherein said rotating step causes said second casing means to rotate said lid means toward said fixed portion of said first casing means.

* * * * *

UNITED STATES PATENT AND TRADEMARK OFFICE
CERTIFICATE OF CORRECTION

PATENT NO. : 5,438,943
DATED : August 8, 1995
INVENTOR(S) : Shigemasa Kato et al.

It is certified that error appears in the above-indentified patent and that said Letters Patent is hereby corrected as shown below:

Column 4, Claim 4, Line 18, "mid" should read -- said --.

Column 4, line 20, place a comma after the word "position" and before the word "said".

Column 4, Claim 8, Line 60, "Said" should read -- said --.

Signed and Sealed this

Twenty-eighth Day of November 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,438,943
DATED : August 8, 1995
INVENTOR(S) : Shigemasa Kato et al.

It is certified that error appears in the above-indentified patent and that said Letters Patent is hereby corrected as shown below:

On the cover page, in Column 1, at [73], "Corporotion" should read -- Corporation -- and "Chofu" should read -- Tokyo --.

Signed and Sealed this

Seventh Day of May, 1996

Attest:

BRUCE LEHMAN

Attesting Officer Commissioner of Patents and Trademarks